United States Patent [19]

Kasai

[11] Patent Number: 4,868,954
[45] Date of Patent: Sep. 26, 1989

[54] SWIVEL JOINT ASSEMBLY

[75] Inventor: Kazumi Kasai, Namerikawa, Japan

[73] Assignee: Nippon Notion Kogyo Co., Ltd., Tokyo, Japan

[21] Appl. No.: 168,579

[22] Filed: Mar. 7, 1988

Related U.S. Application Data

[63] Continuation of Ser. No. 794,585, Nov. 1, 1985, abandoned, which is a continuation of Ser. No. 514,008, Jul. 15, 1983, abandoned.

[30] Foreign Application Priority Data

Jul. 23, 1982 [JP] Japan .................... 57-112285[U]

[51] Int. Cl.$^4$ ............................................ A44B 13/02
[52] U.S. Cl. .................... 24/237; 24/265 H
[58] Field of Search ............... 24/231, 236, 237, 240, 24/241 SP, 241 PL, 297, 265 R, 265 BL, 265 EC, 265 H; 248/284, 324; 59/95

[56] References Cited

U.S. PATENT DOCUMENTS

| | | | |
|---|---|---|---|
| 565,052 | 8/1896 | Thompson | 24/231 X |
| 633,927 | 9/1899 | Vincent | 59/95 X |
| 1,516,875 | 11/1924 | Allen et al. | 59/95 |
| 1,598,684 | 9/1926 | Jensen | 24/239 |
| 2,787,435 | 4/1957 | Shields | 24/237 X |
| 3,144,694 | 8/1964 | Cross, Jr. et al. | 24/625 |
| 3,443,005 | 5/1969 | Braun | 264/242 X |
| 3,456,913 | 7/1969 | Lutz . | |
| 3,577,608 | 5/1971 | Texler | 24/625 |
| 3,973,301 | 8/1976 | Buhr | 24/239 |
| 3,995,822 | 12/1976 | Einhorn et al. . | |
| 4,443,917 | 4/1984 | Oddenino | 24/241 SL |
| 4,464,813 | 8/1984 | Bakker et al. | 24/236 X |

FOREIGN PATENT DOCUMENTS

| | | |
|---|---|---|
| 21671/77 | 2/1980 | Australia . |
| 49481/79 | 2/1982 | Australia . |
| 1918014 | 6/1965 | Fed. Rep. of Germany . |
| 482853 | 2/1917 | France . |
| 1111742 | 3/1956 | France ........................... 24/625 |
| 1122172 | 5/1956 | France . |
| 34-2814 | 3/1959 | Japan . |
| 35-1015 | 1/1960 | Japan . |
| 35-10516 | 5/1960 | Japan . |
| 50-752 | 1/1975 | Japan . |
| 7934 | 5/1978 | Japan ........................... 264/242 |
| 55-45930 | 10/1980 | Japan . |
| 652878 | 5/1951 | United Kingdom . |
| 1369201 | 10/1974 | United Kingdom . |

OTHER PUBLICATIONS

Buck & Kickman, Ltd., Catalog Page 718, Date Unknown.

Primary Examiner—James R. Brittain

[57] ABSTRACT

A swivel hook assembly for attachment to a carrying strap of a bag, for example, includes a connector, an elongate support rotatably mounted on the connector, and a hook mounted on the elongate support. The connector, the support and the hook are all molded of synthetic resin. The hook has a head rotatably fitted in a central hole defined in the support and locked against removal therefrom. The connector and the support are simultaneously molded in a single step of molding operation in an assembled condition. The hook may be molded integrally with the support. The swivel hook assembly is composed of a relatively reduced number of parts, can be assembled easily and less costly, and may be colored to meet user's various preferences for fashionable color combinations.

11 Claims, 3 Drawing Sheets

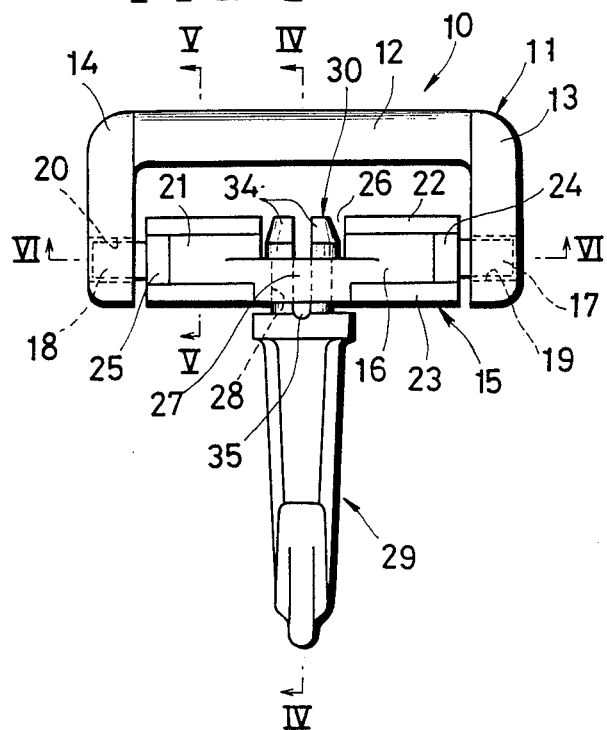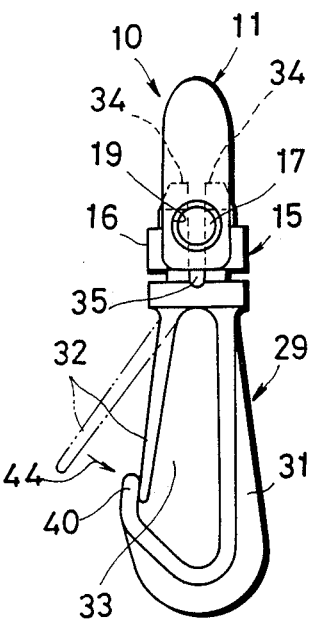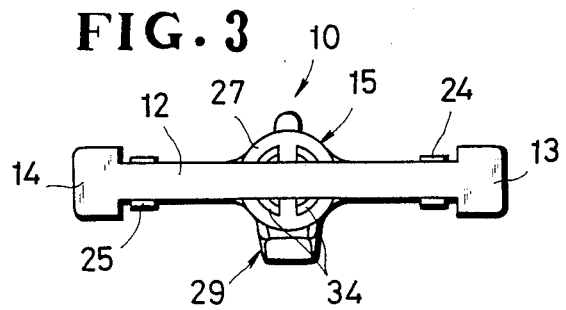

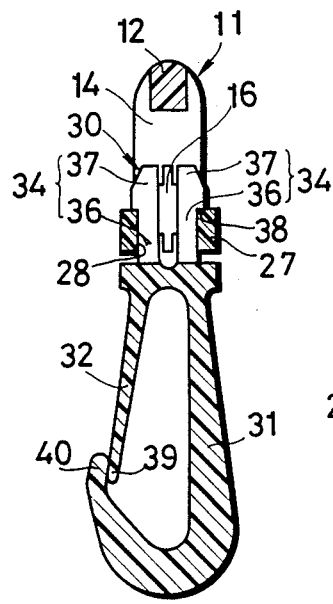
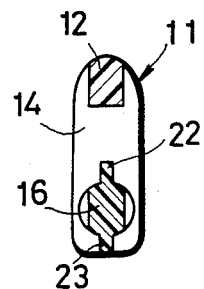
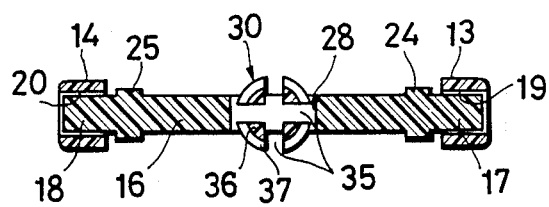
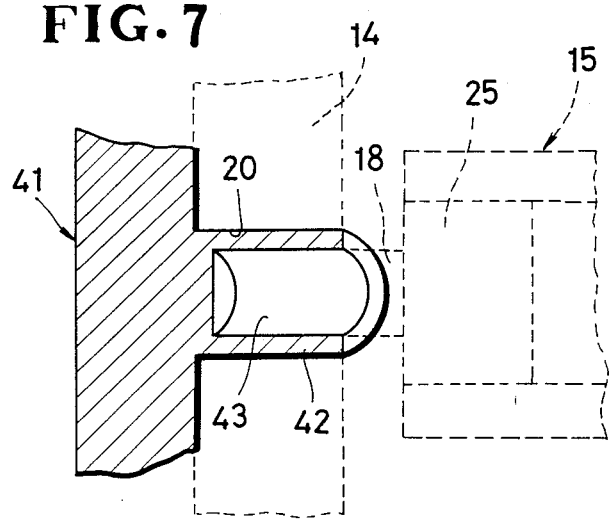

SWIVEL JOINT ASSEMBLY

This is a continuation of application Ser. No. 794,585, filed November 1, 1985, abandoned, which was a continuation of application Ser. No. 514,008, filed July 15, 1983 (now abandoned).

BACKGROUND OF THE INVENTION

1. Field of the Invention:

The present invention relates to a swivel hook assembly made of synthetic resin for use on a carrying strap of a bag, for example.

2. Description of the Prior Art:

There have been proposed and used various swivel hook assemblies made of metal or synthetic resin for attachment to an end of a carrying strap of a bag such as a shoulder bag. The swivel hook assemblies mainly comprise a connector to be attached to the strap and an openable hook rotatably joined to the connector. The prior devices require an additional retaining member by which the hook and the connector are rotatably coupled together through a swivel connection. The known swivel hook arrangements are constructed of relatively many parts, need to be assembled in an increased number of steps, and hence are costly to manufacture. The swivel hooks of metal are additionally disadvantageous in that they cannot easily be colored to meet user's demands for fashionably colored products, and, for this reason, are not suitable for use on shoulder bags, traveling bags and the like.

SUMMARY OF THE INVENTION

It is an object of the present invention to provide a swivel hook assembly which is made of relatively few components, easy and less costly to assemble, lightweight, and can easily be colored to meet user's preferences for fashionable color combinations.

According to the present invention, a swivel hook assembly comprises a connector, an elongate support rotatably mounted on the connector, and a hook mounted on the elongate support, all molded of synthetic resin. The connector and the support are simultaneously molded in one step of molding operation in a combined state allowing relative rotation. The hook has a head rotatably fitted in a hole defined longitudinally centrally in the support and locked against removal from the hole. According to another embodiment, the hook and the support may be molded integrally with each other.

Many other advantages and features of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 1 is a front elevational view of a swivel hook assembly according to the present invention;

FIG. 2 is a side elevational view of FIG. 1;

FIG. 3 is a plan view of FIG. 1;

FIG. 4 is a cross-sectional view taken along line IV—IV of FIG. 1;

FIG. 5 is a cross-sectional view taken along line V—V of FIG. 1;

FIG. 6 is a cross-sectional view taken along line VI—VI of FIG. 1;

FIG. 7 is a perspective view, partly in cross section, of a mold die employed for molding parts of the swivel hook assembly illustrated in FIG. 1;

DESCRIPTION OF THE PREFERRED EMBODIMENTS

Figure 8:
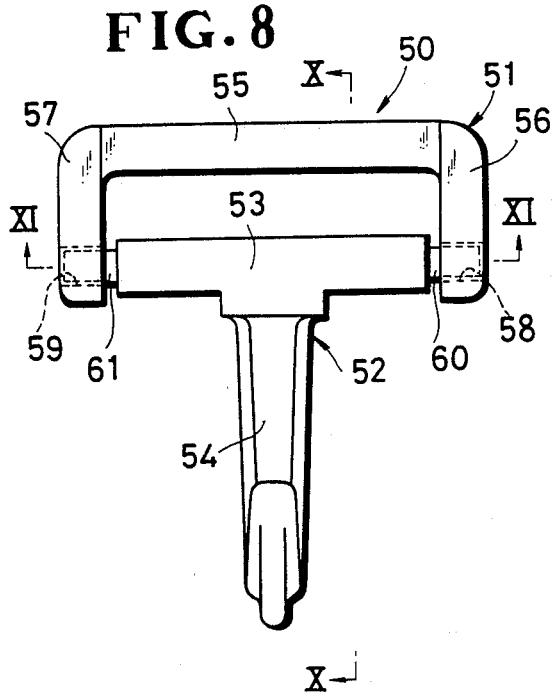
FIG. 8 is a front elevational view of a swivel hook assembly according to another embodiment of the present invention.

As shown in FIGS. 1 through 3, a swivel hook assembly 10 has a connector 11 of an inverted U-shape composed of a horizontal bar 12 and a pair of laterally spaced legs 13, 14 mounted on the connector 11 at opposite ends thereof and extending vertically downwardly parallel to each other. The horizontal bar 12 and the vertical legs 13, 14 are integrally molded of synthetic resin. The bar 12 will be attached to an end of a carrying or shoulder strap of a bag, for example. The bar 12 is thinner than the legs 13, 14, as illustrated in FIG. 3.

The swivel hook assembly 10 also comprises a horizontal elongated support 15 of synthetic resin spaced downwardly from the horizontal bar 12 in parallel relationship and including a central portion 16 and a pair of coaxial shafts 17, 18 extending from opposite ends thereof. The shafts 17, 18 are rotatably journalled respectively in holes 19, 20 defined in the legs 13, 14. Therefore, the support 15 is rotatable relatively to the connector 11 about the axes of the shafts 17, 18.

The central portion 16 includes a main body 21, a pair of upper and lower thinner ribs 22, 23 on the main body 21, and a pair of end flanges 24, 25 on opposite ends of the main body 21, the shafts 17, 18 projecting from the flanges 24, 25, respectively. The central portion 16 has a recess 26 defined longitudinally centrally therein and extending from an upper edge of the central portion 16 transversely at a substantially central position therein. The central portion 16 also includes a horizontal circular seat 27 disposed downwardly of the recess 26 and projecting transversely on opposite sides of the central portion 16, the horizontal circular seat 27 having an upper surface lying flush with the bottom of the recess 26. The horizontal circular seat 27 has a central vertical through hole 28 coaxial therewith in communication with the recess 26. The through hole 28 has a diameter smaller than the length of the recess 26 in the longitudinal direction of the central portion 16.

A hook 29 comprises a head 30, a hook body 31 extending downwardly from the head 30, and a locking bar 32 extending downwardly from the head 30 for closing an opening 33 defined by the hook body 31. The head 30, the hook body 31 and the locking bar 32 are integrally molded of synthetic resin. As better shown in FIGS. 3 and 6, the head 30 is composed of four locking members 34 angularly equally spaced and separated by a cross-shaped slot 35. Each of the locking members 34 has a neck 36 and a retainer 37 tapered off toward its end remote from the neck 36, the retainer 37 having a downwardly facing shoulder 38. The locking bar 32 has an upper end integral with the head 30 and a lower distal end 39 engageable with a distal end 40 of the hook body 31.

The head 30 has a diameter around the necks 36 which is slightly smaller than the diameter of the hole 28 in the horizontal circular seat 27, and a maximum diameter around the locking members 34 which is larger than the diameter of the hole 28. The axial length of the retainers 37 is such that when they are placed on the circular seat 27 with the necks 36 in the hole 28, the retainers 37 do not project out of the recess 26.

For mounting the hook 29 on the support 15, the retainers 37 are forced through the hole 28 while the locking members 34 resiliently flex radially inwardly in the hole 28 until the retainers 37 emerge out of the hole 28, whereupon the retainers 37 snap radially outwardly with the shoulders 38 thereof held against the upper surface of the circular seat 27 and the bottom of the recess 26. The necks 36 of the head 34 are now located within the hole 28. Once the retainers 37 are fully positioned in the recess 26, they are prevented by the shoulders 38 from slipping out through the hole 28. Therefore, the hook 29 is securely mounted on the support 15. Since the diameter of the head 30 around the necks 36 is smaller than the diameter of the hole 38, the hook 29 can rotate about its own axis with respect to the support 15. The support 15 as mounted on the connector 11 is also rotatable about the axes of the shafts 17, 18. This construction allows the hook 29 to rotate about two perpendicular axes relative to the connector 11.

FIG. 7 illustrates a mold die 41 for simultaneouly molding one of the legs 14 and a corresponding one of the shafts 18 disposed therein in one step of molding operation. The mold die 41 includes a hollow cylindrical projection 42 having an outer peripheral profile complementary to the hole 20 in the leg 14 and an inner cylindrical cavity 43 complementary in shape to the shaft 18, the hollow cylindrical projection 42 having an axial length equal to the thickness of the leg 14. During molding operation, the shaft 18 is formed in the cavity 43 while at the same time a cylindrical surface of the leg 14 defining the hole 20 is formed by the outer periphery of the hollow cylindrical projection 42. Another identical mold die is employed to mold the leg 13 and the associated shaft 17 at the same time. These two mold dies are part of a mold die assembly for simultaneously molding the connector 11 and the support 15 in an assembled state.

The connector 11 and the support 15 can therefore be combined with each other in a single step of molding operation. The support 15 thus molded simultaneously with the connector 11 is nevertheless rotatable relatively to the connector 11. With such an arrangement, no separate steps of molding the connector 11 and the support 15 and then assembling them together are necessary. After the connector 11 and the support 15 have been molded in a combined state, the hook 29 is mounted on the support 15 in the manner described above. Consequently, the overall process for assembling the swivel hook assembly 10 is quite simplified and much less costly as only the hook 29 needs to be attached to the support 15 that has already been combined with the connector 11 in a molding process.

The hook 29 is molded separately from the connector 11 and the support 15. A mold die for forming the hook 29 has mold cavities respectively for molding the hook body 31 in the solid-line position shown in FIG. 2 and the locking bar 32 in the two-dot-and-dash-line position. As molded, therefore, the locking bar 32 has its distal end spaced from the distal end 40 of the hook body 31. The locking bar 32 as thus formed is then elastically bent from the two-dot-and-dash-line position in a direction normal to the sheet of FIG. 2, and forced against its own resiliency in the direction of the arrow 44 to the solid-line position in which the distal end of the locking bar 32 is engaged by the distal end 40. The distal end of the locking bar 32 is now forcibly pressed against the distal end 40 under the resiliency of the locking bar 32.

The swivel hook assembly 10 is composed of a reduced number of parts, that is, only the connector 11, the support 15, and the hook 29, and can be assembled with utmost ease and less costly. Since all of the components are made of synthetic resin, they can be injection-molded in large quantities and hence inexpensively, and can be colored as desired to meet user's various color preferences in vogue.

FIGS. 8 through 11 show a swivel hook assembly, generally indicated at 50, according to another embodiment of the present invention. The swivel hook assembly 50 is composed of a connector 51 of an inverted U-shape and an integral T-shaped hook and support combination 52 having a horizontal support 53 and a hook 54. The connector 51 has a horizontal bar 55 and a pair of laterally spaced legs 56, 57 with holes 58, 59 defined therein, respectively, in coaxial alignment. The horizontal support 53 includes a pair of opposite shafts 60, 61 rotatably fitted in the holes 58, 59, respectively. The T-shaped hook and support combination 52 is therefore rotatable about the axes of the shafts 60, 61 relatively to the connector 51. The hook 54 has an upper end integrally joined to the support 53 and extends perpendicularly from a longitudinally central portion of the horizontal support 53.

Figure 9:
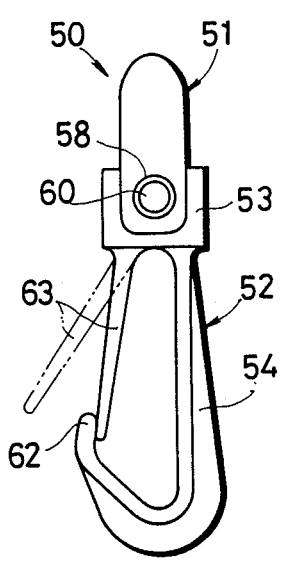
FIG. 9 is a side elevational view of FIG. 8.
Figure 11:
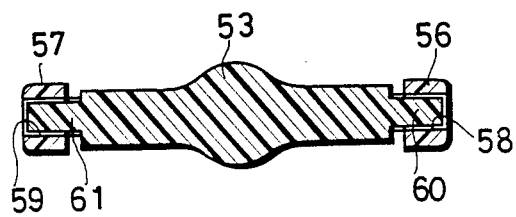
FIG. 11 is a cross-sectional view taken along line XI—XI of FIG. 8.
Figure 10:
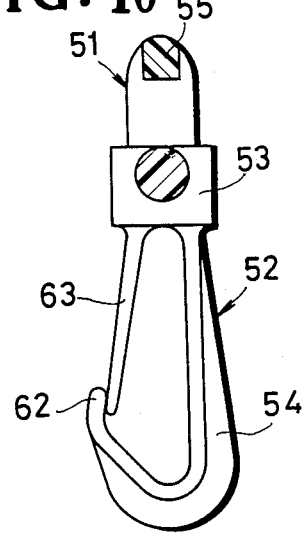
FIG. 10 is a cross-sectional view taken along line X—X of FIG. 8.

The connector 51 and the hook and support combination 52 can be integrally molded of synthetic resin simultaneously in a single step of operation by a mold die assembly including mold dies such as shown in FIG. 7. As molded, the hook and support combination 52 is rotatable about the axes of the shafts 60, 61 relatively to the connector 51. The hook 54 has a distal end 62 and a locking bar 63 which is resiliently brought into engagement with the distal end 62 as shown in FIG. 9, after the hook 54 has been molded. The swivel hook assembly 50 is composed of only two parts, the connector 55 and the hook and support combination 52 which are molded at the same time in an assembled condition. The only step of completing the swivel hook assembly 50 is to engage the locking bar 63 with the distal end 62 of the hook 54. Therefore, the swivel hook assembly 50 can more easily be fabricated than the swivel hook assembly 10 illustrated in FIG. 1.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A swivel hook assembly consisting of synthetic resin for use on a strap, comprising:
   (a) a connector for being attached to the strap and having a bar and a pair of legs each joined to said bar at opposite bar ends, respectively, said legs having a pair of coaxial holes therein;
   (b) an elongated support spaced transversely from said bar and having on opposite ends a pair of coaxial shafts pivotally disposed in said holes, said elongated support having a rigid longitudinally central recess facing said bar and a smaller transverse through-hole extending through said support and. said recess; and (c) a hook, including a hook body, having a distal end and defining an opening, a resilient locking bar integral with said hook body and pivotally engageable with said distal end for normally closing said opening, and a head from which said hook body extends, said head having a neck of smaller diameter than said through-hole and including a plurality of angularly spaced resilient locking members extending away from said distal end of said body and extending rotatably through said through-hole and terminating in radially outwardly extending projections having a tapered configuration permitting resilient passage into and through said through-hole but preventing removal out of said through-hole, said recess being opened on opposite sides of said bar to enable access to the projection of the locking members.

2. A swivel snap hook assembly for use on a strap, said assembly consisting of a connector part, an elongated support part and a one-piece hook part assembled together with each part being made of synthetic resin, said connector part being attachable to the strap and including a bar and a pair of legs extending integrally from opposite bar ends, respectively, said legs having a pair of coaxial holes therein, said elongated support part having a pair of coaxial shafts on opposite ends and a central transverse through-hole, said pair of coaxial shafts being pivotally received in said coaxial holes, respectively, of said connector, and said one-piece hook part including a hook body having one end curved to define an opening, a resilient locking bar integral with another end of said hook body and resiliently engageable with the one end of said hook body for normally closing said opening, and a head integral with said another end of said hook body extending away from the one end of said hook body and having a retainer comprising a plurality of angularly spaced resilient locking members extending away from said opening, each of said locking members having a neck portion extending loosely through said through-hole and terminating in an enlarged end so that said head part is rotatably retained on said elongated support part by said enlarged ends against removal out of said through-hole, said support part having a rigid longitudinally central recess facing said bar which recess is larger than said transverse through-hole and said enlarged ends, thereby forming an annular seat in said recess which is coaxial with said through-hole facing away from the other end of said hook body and whereby said retainer is rotatably held in said central recess by said seat, said recess being opened at lateral sides of the support part to provide access to the enlarged ends of the retainer.

3. A swivel hook assembly according to claim 2, said head having a first diameter around said neck portions which is smaller than the diameter of said through-hole for swivelling therein and a second diameter around said enlarged ends which is, in its free form, larger than the diameter of said through-hole.

4. A swivel snap hook assembly according to claim 2, said head being divided to provide four resilient spaced locking members.

5. A swivel snap hook assembly according to claim 2, wherein said elongated support part has a notch extending transverse to the through-hole to form a recessed seating surface for the enlarged ends of the retainer.

6. A swivel hook assembly consisting of synthetic resin for use on a strap, comprising:

(a) a connector for being attached to the strap and having a bar and a pair of legs each joined to said bar at opposite bar ends, respectively, said legs having a pair of coaxial holes therein;

(b) an elongated support spaced transversely from said bar and having on opposite ends a pair of coaxial shafts pivotally disposed in said holes, said elongated support having a rigid longitudinally central recess facing said bar and a smaller transverse through-hole extending through said support at said recess; and (c) a hook, including a hook body, having a distal end and defining an opening, a resilient locking bar integral with said hook body and pivotally engageable with said distal end for normally closing said opening, and a hook head from which said hook body extends, said hook head having a neck of smaller diameter than said through-hole and including a plurality of angularly spaced resilient locking members extending away from said distal end of said body and extending rotatably through said through-hole and terminating in radially outwardly extending projections having a tapered configuration permitting resilient passage into and through said through-hole but preventing removal out of said through-hole, said radially outwardly extending projections having an axial length not larger than the depth of said recess in said elongated support.

7. A swivel hook assembly according to claim 6, said head having an end surface on said projections extending substantially flush with a side surface of said elongated support facing said bar.

8. A swivel snap hook assembly for use on a strap, said assembly consisting of a connector part, an elongated support part and a one-piece hook part assembled together with each part being made of synthetic resin, said connector part being attachable to the strap and including a bar and a pair of legs extending integrally from opposite bar ends, respectively, said legs having a pair of coaxial holes, said elongated support having a pair of coaxial shafts on opposite ends and a central transverse through-hole, said pair of coaxial shafts being pivotally received in said coaxial holes, respectively, of said connector, and said one-piece hook part including a hook body having one end curved to define an opening, a resilient locking bar integral with another end of said hook body and resiliently engageable with the one end of said hook body for normally closing said opening, and a head integral with said another end of said hook body and having a retainer comprising a plurality of angularly spaced resilient locking members extending away from said opening, each of said locking members having a neck portion extending loosely through said through-hole and terminating in an enlarged end so that said head part is rotatably retained on said elongated support part by said enlarged ends against removal out of said through-hole, said support part having a rigid longitudinally central recess facing said bar which recess is larger than said transverse through-hole and said enlarged ends, thereby forming an annular seat in said recess which is coaxial with said through-hole, facing away from the other end of said hook body and whereby said retainer is rotatably held in said central recess by said seat, said enlarged ends having an axial length not in excess of the depth of said recess in said elongated support part.

9. A swivel snap hook assembly according to claim 8, said head having a flat end surface on said enlarged ends extending substantially flush with a side surface of said elongated support part facing said bar.

10. A swivel snap hook assembly according to claim 8, said head having a first diameter around said neck portions which is smaller than the diameter of said through-hole for swivelling therein and a second diameter around said enlarged ends which is, in its free form, larger than the diameter of said through-hole.

11. A swivel snap hook assembly according to claim 8, said head being divided to provide four resilient spaced locking members.

* * * * *